(12) United States Patent
Douglas

(10) Patent No.: US 11,695,772 B1
(45) Date of Patent: Jul. 4, 2023

(54) SYSTEM AND METHOD FOR ENABLING MULTIPLE AUXILIARY USE OF AN ACCESS TOKEN OF A USER BY ANOTHER ENTITY TO FACILITATE AN ACTION OF THE USER

(71) Applicant: Capital One Services, LLC, McLean, VA (US)

(72) Inventor: Lawrence Douglas, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/735,827

(22) Filed: May 3, 2022

(51) Int. Cl.
*H04L 9/40* (2022.01)
*H04L 9/32* (2006.01)

(52) U.S. Cl.
CPC ............ *H04L 63/10* (2013.01); *H04L 9/3213* (2013.01); *H04L 9/3228* (2013.01); *H04L 63/108* (2013.01); *H04L 2209/56* (2013.01)

(58) Field of Classification Search
None
See application file for complete search history.

(56) References Cited

U.S. PATENT DOCUMENTS

| | | | | |
|---|---|---|---|---|
| 6,898,711 B1 * | 5/2005 | Bauman | ............... | G06F 21/31 713/193 |
| 9,935,934 B1 * | 4/2018 | Orozco | ............... | H04L 9/3213 |
| 10,693,644 B2 * | 6/2020 | Kozma | ............... | H04L 9/3213 |
| 11,044,257 B1 * | 6/2021 | Heuts | ............... | H04L 63/108 |
| 11,048,809 B1 * | 6/2021 | Sun | ............... | H04L 63/108 |
| 11,188,887 B1 * | 11/2021 | Limaye | ............... | G06Q 20/385 |
| 11,288,736 B1 * | 3/2022 | Jette | ............... | G06F 9/45558 |
| 2003/0005118 A1 * | 1/2003 | Williams | ............... | H04L 63/10 709/225 |
| 2004/0054750 A1 * | 3/2004 | de Jong | ............... | H04W 12/08 709/217 |
| 2007/0019616 A1 * | 1/2007 | Rantapuska | ............... | H04L 63/065 370/352 |
| 2009/0117883 A1 * | 5/2009 | Coffing | ............... | H04L 51/58 455/414.1 |

(Continued)

OTHER PUBLICATIONS

Fett et al an Extensible Formal Security Analysis of the OpenID Financial-grade API, 2019 IEEE Symposium on Security and Privacy, pp. 453-471 (Year: 2019).*

(Continued)

*Primary Examiner* — Luu T Pham
*Assistant Examiner* — James J Wilcox
(74) *Attorney, Agent, or Firm* — Perkins Coie LLP (57) ABSTRACT

A computing system may receive a request of the user for a first action of the user with an entity. In connection with granting the request of the user, the computing system may configure a token for use by the user and the entity such that (i) the entity is added as an approved entity, and (ii) the token is configured with a resource amount of the first action as a usage threshold of the token. The computing system may receive a request of the entity to use the token. The computing system may determine whether granting the request of the entity would cumulatively exceed the usage threshold of the token. Based on a determination that granting the request of the entity would not cumulatively exceed the resource usage of the token, the computing system may grant the request of the entity to use the token.

20 Claims, 5 Drawing Sheets

(56) References Cited

U.S. PATENT DOCUMENTS

| | | | |
|---|---|---|---|
| 2013/0061337 A1* | 3/2013 | Zimberoff | G06Q 10/08 726/30 |
| 2013/0276140 A1* | 10/2013 | Coffing | H04L 63/104 726/27 |
| 2014/0227999 A1* | 8/2014 | Ferlin | H04L 9/3215 455/411 |
| 2015/0095367 A1* | 4/2015 | Mattsson | H04L 9/3213 707/769 |
| 2015/0180868 A1* | 6/2015 | Sng | H04L 63/0846 726/9 |
| 2015/0188902 A1* | 7/2015 | Yoakum | H04L 63/083 726/7 |
| 2016/0073263 A1* | 3/2016 | Wolosewicz | H04W 4/80 726/4 |
| 2016/0255080 A1* | 9/2016 | Griffin | H04L 63/06 713/155 |
| 2017/0033925 A1* | 2/2017 | DeNeut | H04L 9/0819 |
| 2017/0374096 A1* | 12/2017 | Carter | H04L 63/20 |
| 2018/0018660 A1* | 1/2018 | Gomes | H04L 63/102 |
| 2018/0253727 A1* | 9/2018 | Ortiz | G06Q 20/108 |
| 2019/0147515 A1* | 5/2019 | Hurley | G06Q 20/3821 705/44 |
| 2019/0259026 A1* | 8/2019 | Beye | G06Q 20/385 |
| 2019/0372770 A1* | 12/2019 | Xu | H04L 9/3228 |
| 2020/0111080 A1* | 4/2020 | Metcalfe | G06Q 20/3825 |
| 2020/0127840 A1* | 4/2020 | Rule | H04L 9/3234 |
| 2020/0351660 A1* | 11/2020 | Avetisov | H04L 63/083 |
| 2021/0067350 A1* | 3/2021 | McClintock | H04L 9/3268 |
| 2021/0105264 A1* | 4/2021 | Patel | H04L 9/3228 |
| 2021/0152557 A1* | 5/2021 | Lelcuk | H04L 63/101 |
| 2021/0264444 A1* | 8/2021 | Chen | G06Q 30/0643 |

OTHER PUBLICATIONS

Pedrosa et al "Holder-of-Key threshold access token for anonymous data resources," 2021, pp. 1-7 (Year: 2021).*

Emadinia et al "An Updateable Token-Based Schema for Authentication and Access Management in Clouds," 2019 7th International Conference on Future Internet of Things and Cloud (FiCloud), pp. 50-56 (Year: 2019).*

Nandakumar et al "Secure one-time biometric tokens for non-repudiable multi-party transactions," WIFS '2017, IEEE, pp. 1-6 (Year: 2017).*

Huber et al "A Secure Token-Based Communication for Authentication and Authorization Servers," Conference Paper in Lecture Notes in Computer Science, Nov. 2016, pp. 1-16 (Year: 2016).*

J.P. Morgan Access Credential Services User Guide, pp. 1-31, Apr. 13, 2020 (Year: 2020).*

* cited by examiner

| Requests 251 | Thresholds 252 |
|---|---|
| Requests for Entity A | 4 |
| Requests for Entity B | 16 |
| Total Requests Allowed for Token | 50 |

SYSTEM AND METHOD FOR ENABLING MULTIPLE AUXILIARY USE OF AN ACCESS TOKEN OF A USER BY ANOTHER ENTITY TO FACILITATE AN ACTION OF THE USER

BACKGROUND

Tokens (e.g., web tokens) may be used in computing systems in various ways, including authentication, authorization, or for information exchange. For example, when a user successfully logs in using their credentials, a token may be returned and used to authenticate the user. After a user has successfully logged in, an application may request to access routes, services, or resources (e.g., Application Programming Interfaces (APIs)) on behalf of that user. To do so, the token may be exchanged. Further, tokens may be used to securely transmit information between parties because a token may be signed, which provides confidence that the senders are who they say they are.

SUMMARY

Despite the beneficial use cases of tokens described above, tokens have a number of drawbacks related to authorization and security. For example, malicious actors may steal a token and use it without the original user's permission. In existing computing systems, this is possible because whoever has possession of a token is able to use it. Because a token may be used for any purpose once a third-party has possession or access to the token, it can be difficult for a user (e.g., the owner of the token) to control how the token is used. This is true even for third parties that may initially be given permission to use the token. Eventually, the third-party that was initially granted access to the token may use it in ways that the user has not authorized. For example, with respect to typical token systems, a cloud system may be authorized (e.g., via a token) to automatically train a machine learning model. Although the user may wish to control the amount of resources (e.g., computing power, computing time, etc.) that is used to train the machine learning model, the cloud system may end up using more than the requested amount of resources or may use a training dataset for longer than is authorized. Typical token systems provide no mechanism that allows the user to enforce resource limitations on the use of the token beyond those limitations which are already applied to the user's usage.

To address these issues, non-conventional methods and systems described herein provide the ability for tokens to be configured for limited use by a set number of users or entities. In this way, a user device may be provided better control over how a token is used. For example, a cloud system may be authorized (e.g., via a token) to automatically train a machine learning model. A token of the user device can be configured specifically for allowing the cloud system to train the machine learning model a number of times using a specified amount of resources (e.g., a specified amount of resources from a set of resources allocated to the user at the cloud system or a set of resources allocated to the user at one or more other cloud systems). For example, the token may authorize the cloud system to train the machine learning model a first time using a first amount of computing resources and a second time using a second amount of computing resources. Any additional training of the machine learning model by the cloud system may be prevented due to the configuration of the token.

In some embodiments, a computing system may receive a request of the user for a first action of the user with an entity. For example, the action may include authorizing a cloud system to use a set of training data for a limited amount of time. In connection with granting the request of the user, the computing system may configure a token for use by the user and the entity such that (i) the entity is added as an approved entity having permission to use the token to facilitate the first action of the user, and (ii) the token is configured with a resource amount of the first action as a usage threshold of the token for actions of the entity related to the first action. For example, the cloud system may be added as an approved entity and may be allowed to use the training data for a certain time period (e.g., two weeks or other time period) or a certain amount of the training data (e.g., ten gigabytes a day or other resource amount limitation).

The computing system may receive a request of the entity to use the token (e.g., to train a machine learning model using the dataset). The computing system may determine whether granting the request of the entity would cumulatively exceed the usage threshold of the token (e.g., the maximum amount of time that the cloud system is allowed to use the training data). Based on a determination that granting the request of the entity would not cumulatively exceed the resource usage of the token, the computing system may grant the request of the entity to use the token.

Various other aspects, features, and advantages of the disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion) a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, some structures and devices are shown in block diagram form to avoid unnecessarily obscuring the disclosure.

Figure 1:
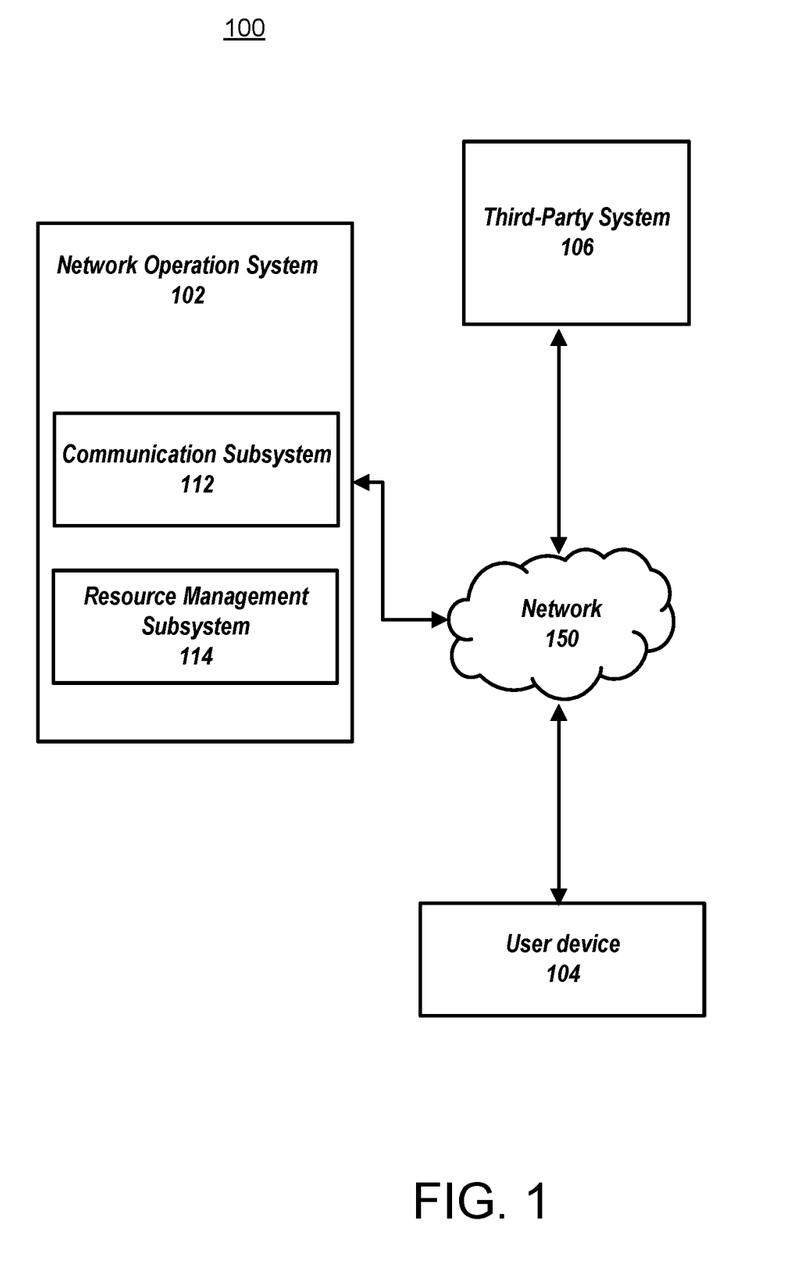
FIG. 1 shows an example system for enabling third-party use of a token to perform a network operation, in accordance with some embodiments.

FIG. 1 shows an example computing system 100 for enabling third-party use of a token to perform a network operation. A computing system may receive, from a user, a request for a first action of the user with an entity. For example, the action may include authorizing the entity to store data of the user at a data storage system associated with the entity. In connection with granting the request of the user, the computing system may configure a token for use by the user and the entity. In one use case, the token may be configured such that (i) the entity is added as an approved entity of the token (e.g., having permission to use the token to facilitate the first action of the user), and (ii) a resource amount of the first action is set as a usage threshold of the token for actions of the entity related to the first action. For example, the entity may be given authorization to store data of the user and the resource amount may indicate an amount of data that the entity is authorized to store. The computing system may receive a request of the entity to use the token (e.g., to complete a transfer of data from the user to the entity). The computing system may determine whether granting the request of the entity would cumulatively exceed the usage threshold of the token (e.g., the maximum amount of data that the entity is authorized to store using the token, the maximum number of granted requests of the entity to store data of the user using the token, etc.). Based on a determination that granting the request of the entity would not cumulatively exceed the resource usage of the token, the computing system may grant the request of the entity to use the token.

The system 100 may include a network operation system 102, one or more third-party systems 106, or one or more user devices 104, or other components. The network operation system 102 may include a communication subsystem 112, a resource management subsystem 114, or other components. In some embodiments, network operation system 102 may be implemented in software and may execute on a user device 104 or other components of system 100.

The network operation system 102 may generate an access token for use by an owner user and a third-party entity. The access token may be used multiple times (e.g., a threshold number of times) or the access token may be a single-use access token. The access token may be designated (e.g., by the network operation system 102) to support a network operation between the token owner user and the third-party entity. The network operation system 102 may provide the ability for tokens to be configured for limited use by a set number of users or entities.

The network operation system 102 may provide the ability for tokens to be configured for limited use by a set number of users or entities. A user may be provided better control over how a token is used. For example, a cloud system may be authorized (e.g., via a token) to automatically train a machine learning model. A token of the user device can be configured specifically for allowing the cloud system to train the machine learning model a number of times using a specified amount of resources. For example, the token may authorize the cloud system to train the machine learning model a first time using a first amount of computing resources and a second time using a second amount of computing resources. The machine learning model may be prevented from performing any additional training due to the configuration of the token. In some embodiments, a network operation may include a request to train a machine learning model. For example, the network operation may indicate that a cloud system should train a machine learning model for a particular amount of time (e.g., three days).

The token owner user may designate a third-party entity (e.g., as described in more detail below) as an auxiliary entity (e.g., authorized user) for the token. For example, the token owner may be a user device that designates a particular cloud system of a plurality of cloud systems to perform one or more network operations. The access token may be configured with a token owner usage count threshold by the token owner. For example, the token may indicate that a cloud system may train a machine learning model three times using a particular set of data. Alternatively or additionally, the token may indicate that the cloud system may use a threshold amount of computing resources (e.g., computing time, computing power, etc.) to train the machine learning model.

In some embodiments, a network operation may be a transaction. For example, a network operation may be a card transaction between a user and a merchant. In some embodiments, an issuer of the token (e.g., a virtual card number) may provide a preauthorization or an authorization hold so that the transaction amount is available for the merchant to use (e.g., in the future, when an item is shipped to the user, etc.).

The token owner user may designate a third-party entity (e.g., as described in more detail below) as an auxiliary entity for the token. For example, the token owner may be a user that is shopping via the Internet and the third-party entity may be a merchant. The token may be designated for use by the merchant. The token may be designated for use by only one merchant, in which case no other merchant or user may be able to use the token. The access token may be configured with a token owner usage count threshold by the token owner. For example, the token may be limited to one use or transaction. The use or transaction may include multiple subparts. For example, the token may be configured to be used to pay a third-party entity (e.g., a merchant) in multiple parts. Each part of the payment may be included as the one use or transaction.

The network operation system 102 may detect an owner-initiated request for use of the access token for a first network operation. The first network operation may be a transaction between the owner user (e.g., via the user device 104) and the third-party entity (e.g., via the third-party computing system 106). For example, the owner-initiated request may indicate that a third-party entity should be granted permission to use the token.

The network operation system 102 may bind the token to the third-party entity. Binding the token with the third-party entity may include configuring the token such that the third-party entity is set as an auxiliary entity of the token. For example, setting the third-party entity as an auxiliary entity of the token may include providing permission to the third-party entity to use the token. Configuring the token such that the third-party entity is set as an auxiliary entity may prevent other third-party entities (e.g., any user other than the owner and the third-party entity to which the token has been bound) from using the token.

Binding the token with the third-party entity may include configuring a resource amount of the first network operation as an auxiliary resource threshold of the access token. The network operation system 102 may set a maximum resource amount that the third-party entity is allowed to use in connection with the token. For example, the third-party entity may be allowed to charge up to a maximum amount on the token (e.g., virtual card number) for a transaction. The maximum resource amount may be the total amount the third-party entity may charge to the token for a transaction (e.g., including all subparts of the transaction). For example, if the resource amount configured as an auxiliary resource threshold is $60 and the transaction with the third-party entity includes three payments of $20, the third-party entity may be allowed to charge the token three times for $20 each time, but may be restricted from charging the token after the total amount charged has reached $60.

The network operation system 102 may receive an entity-initiated request of the third-party entity to use the access token. For example, if the third-party entity is the merchant as described in the example above, the merchant may send a request (e.g., to the network operation system) to use the token. The request may include a resource amount of the token that the third-party entity would like to use.

In some embodiments, the network operation system 102 may determine whether the entity that made the request has been granted permission to use resources of the token. If the entity does not have permission to use the token (e.g., has not been bound to the token as described above), the network operation system 102 may deny the request. For example, the network operation system 102 may receive, from a second entity, a second request to use the token. The network operation system 102 may determine that the token has not been configured with the second entity as the approved entity. In response to determining that the token has not been configured with the second entity as the approved entity, the network operation system 102 may deny the second request.

The network operation system 102 may determine whether the resource amount included in the request would exceed (e.g., cumulatively exceed) the resource amount that was configured as an auxiliary resource threshold of the access token. The network operation system 102 may determine whether the auxiliary-entity-initiated request would cumulatively exceed the auxiliary resource threshold of the access token in view of a granting of one or more other auxiliary-entity-initiated requests of the third-party entity to use the access token. For example, the network operation system 102 may determine the sum total of resources that have been previously requested by the third-party entity for the token. If the sum total of resources that have been previously requested when combined with the resource amount included in the request exceed the auxiliary resource threshold, the network operation system 102 may deny the request. For example, if the sum total of resources that have been previously requested is $40 and the resource amount included in the request is $50, then the combined amount is $90. If the auxiliary resource threshold is $60, then the network operation system 102 may deny the request because the combined amount of $90 is greater than $60.

The network operation system 102 may grant a request, for example, in response to determining that the resource amount would not exceed (e.g., cumulatively exceed) the resource threshold (e.g., the auxiliary resource threshold). Granting the request may allow the third-party entity to use the token for the requested amount of resource. For example, by granting the request, the third-party entity may be able to charge the requested amount to the token (e.g., a virtual card number).

The network operation system 102 may deny a request, for example, if the resource amount would exceed (e.g., cumulatively exceed) the resource threshold. For example, the token may include a parameter (e.g., a value) that tracks how much of the resource an entity has used. If the sum of the parameter and the resource amount in the request exceeds the resource threshold, the network operation system 102 may deny the request. The network operation system 102 may receive (e.g., from the entity described above) a second request to use the token. In response to receiving the second request, the network operation system 102 may determine whether granting the second request would exceed the usage threshold of the token. In response to determining that granting the second request would exceed the usage threshold of the token, denying the second request.

In some embodiments, the network operation system 102 may perform one or more additional or alternative checks before granting a request to use resources of the token. The checks may include determining whether more than a threshold number of requests have been made by a particular entity, whether a total number of requests made by any combination of entities has exceeded a threshold number of requests, or other checks. For example, granting the request to use the token may include determining a total number of third-party requests that have been made to use the token, and in response to determining that the total number of third-party requests is less than a threshold number, granting the third-party request to use the token.

Figure 2:
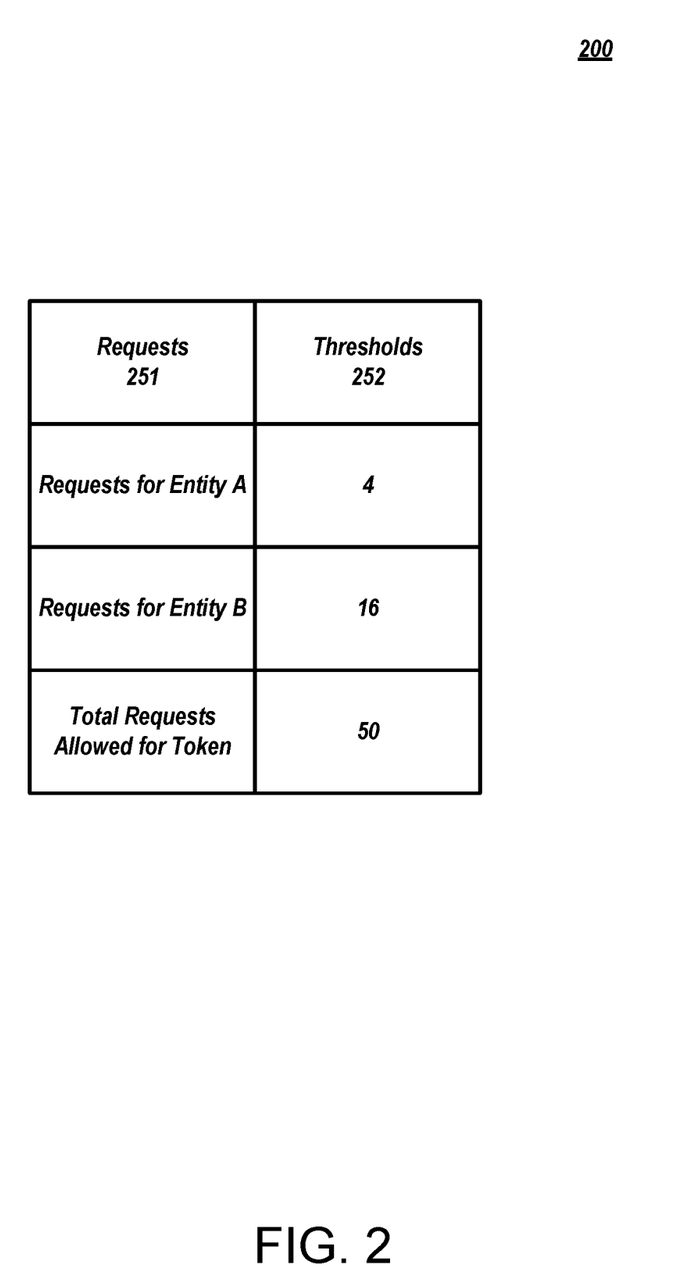
FIG. 2 shows example request thresholds, in accordance with some embodiments.

As an example, FIG. 2 shows a table with various request thresholds. As shown in the Requests column 251 and the Thresholds column 252, there may be separate request thresholds for different entities and there may be a separate request threshold for the token (e.g., a total amount of times that the token may be used). For example, Entity A may be limited to 4 requests or uses of the token. Entity B may be limited to 16 requests or uses of the token. The total number of times that the token may be used (e.g., the total number of times the token may be approved to be charged or used to access resources) may be 50 times.

Additionally, or alternatively, one or more other checks may include determining whether the request is made after a threshold date. For example, granting the request of an entity may include determining that the request of the entity is received before a threshold date. If the request of the entity is received before the threshold date, the network operation system 102 may grant the request of the entity. The network operation system 102 may deny a request, for example, if the request is made after a threshold date. The threshold date may be stored as a parameter of the token.

The network operation system 102 may update one or more parameters of the token to reflect use of the token for a usage amount indicated by the request of the entity. Updating a parameter of the token may allow the network operation system 102 to make sure that the resources of the token are not overused by the entity or the user. For example, if the token is a cloud service access token, the amount of bandwidth or the number of hours of a cloud service used in connection with the token may be tracked so that a bandwidth or time usage threshold may not be exceeded. As another example, if the token is a virtual transaction card, a monetary amount charged to the virtual transaction card may be tracked so that a threshold amount to be charged (e.g., the resource limit) may not be exceeded. The updating may be in response to granting the request of the entity. The token may include one or more parameters, for example, to indicate a total amount of resources that the token has available, to indicate a resource threshold (e.g., the auxiliary resource threshold described above) for a particular third-party entity, or to indicate a running total amount of resource that a third-party entity has used (e.g., a sum of resource amounts of each request that has been granted in connection with the token). For example, the token may include any parameters discussed in connection with FIGS. 2-3.

Figure 3:
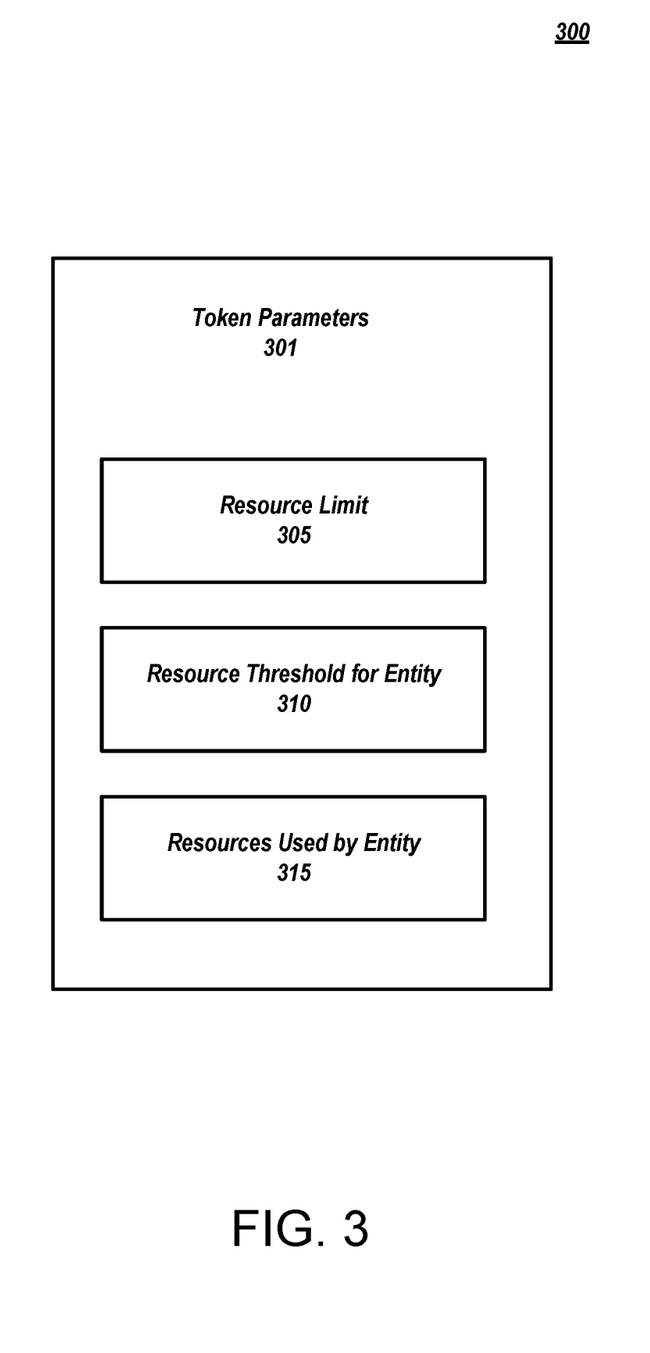
FIG. 3 shows example token parameters, in accordance with some embodiments.

FIG. 3 shows a table 300 with example token parameters 301. The token parameters 301 may include a resource limit 305. The resource limit may be a total amount of resources that the token has access to or a total amount of resources that may be used in connection with the token. For example, if the token is a cloud service access token, the resource limit parameter 305 may be a bandwidth threshold or time usage threshold (e.g., number of hours of a cloud service used in connection with the token). As another example, if the token is a virtual transaction card, the resource limit parameter 305 may be a transaction amount threshold associated with the token. The resource threshold for entity parameter 310 may be the auxiliary resource threshold described in connection with FIG. 1 or FIG. 4. The resource threshold for entity parameter 310 may be the maximum amount of resource (e.g., an amount of training data or other data in gigabytes, an amount of network bandwidth in gigabytes, an amount of hours of usage of a cloud service, a monetary amount to be charged to an account, etc.) that can be used or charged to the token by an entity that has been configured as an auxiliary entity of the token (e.g., as described in connection with FIG. 1 or FIG. 4). The resources used by entity parameter 315 may be a running total of the amount of resources that have been used by a particular entity. For example, if a first entity has charged the virtual transaction card twice for $10 each time, the resources used by entity parameter 315 have a value of $20. The parameters described in FIG. 3 may be used to perform one or more actions described in FIG. 1, 2, or 4.

Figure 4:
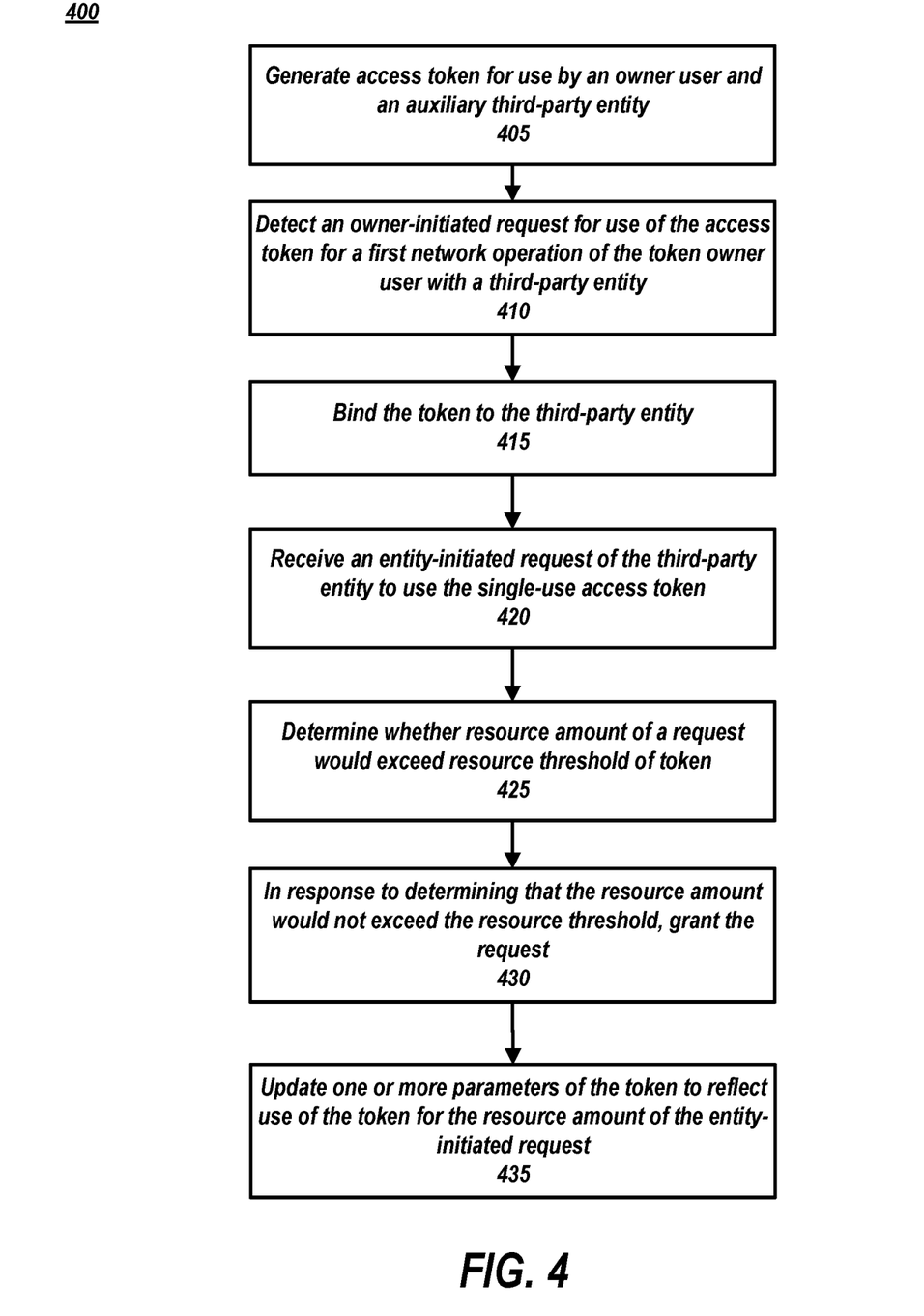
FIG. 4 shows an example flowchart of the actions involved in enabling multiple third-party auxiliary use of a token, in accordance with some embodiments.

It is contemplated that the actions or descriptions of FIG. 4 may be used with any other embodiment of this disclosure. In addition, the actions and descriptions described in relation to FIG. 4 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-3 or FIG. 5 could be used to perform one or more of the actions in FIG. 4.

The user device 104 may be any computing device, including, but not limited to, a laptop computer, a tablet computer, a hand-held computer, smartphone, and other computer equipment (e.g., a server or virtual server), including "smart," wireless, wearable, or mobile devices. The network operation system 102 may include one or more computing devices described above or may include any type of mobile terminal, fixed terminal, or other device. For example, the network operation system 102 may be implemented as a cloud-computing system and may feature one or more component devices. A person skilled in the art would understand that system 100 is not limited to the devices shown in FIG. 1. Users may, for example, utilize one or more other devices to interact with devices, one or more servers, or other components of system 100. A person skilled in the art would also understand that while one or more operations are described herein as being performed by particular components of the system 100, those operations may, in some embodiments, be performed by other components of the system 100. As an example, while one or more operations are described herein as being performed by components of the network operation system 102, those operations may be performed by components of the user device 104, or third-party system 106. In some embodiments, the various computers and systems described herein may include one or more computing devices that are programmed to perform the described functions.

One or more components of the network operation system 102, user device 104, or third-party system 106, may receive content or data via input/output (I/O) paths. The one or more components of the network operation system 102, the user device 104, or the third-party system 106 may include processors or control circuitry to send and receive commands, requests, and other suitable data using the I/O paths. The control circuitry may include any suitable processing, storage, or I/O circuitry. Each of these devices may include a user input interface or user output interface (e.g., a display) for use in receiving and displaying data. It should be noted that in some embodiments, the network operation system 102, the user device 104, or the third-party system 106 may have neither user input interfaces nor displays and may instead receive and display content using another device (e.g., a dedicated display device such as a computer screen or a dedicated input device such as a remote control, mouse, voice input, etc.).

One or more components or devices in the system 100 may include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a universal serial bus (USB) port, a firewire port, etc.) or a drive (e.g., a disk drive, etc.). The electronic storages may include one or more of optically readable storage media (e.g., optical discs, etc.), magnetically readable storage media (e.g., magnetic tape, magnetic hard drive, floppy drive, etc.), electrical charge-based storage media (e.g., electrically erasable programmable read-only memory (EEPROM), random access memory (RAM), etc.), solid-state storage media (e.g., flash drive, etc.), or other electronically readable storage media. The electronic storages may include one or more virtual storage resources (e.g., cloud storage, a virtual private network, or other virtual storage resources). The electronic storages may store software algorithms, information determined by the processors, information obtained from servers, information obtained from client devices, or other information that enables the functionality as described herein.

FIG. 1 also includes a network 150. The network 150 may be the Internet, a mobile phone network, a mobile voice or data network (e.g., a 5G or Long-Term Evolution (LTE) network), a cable network, a satellite network, a combination of these networks, or other types of communications networks or combinations of communications networks. The devices in FIG. 1 (e.g., network operation system 102, the user device 104, or the third-party system 106) may communicate (e.g., with each other or other computing systems not shown in FIG. 1) via the network 150 using one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The devices in FIG. 1 may include additional communication paths linking hardware, software, or firmware components operating together. For example, the network operation system 102, any component of the processing system (e.g., the communication subsystem 112, the resource management subsystem), the user device 104, or the third-party system 106 may be implemented by one or more computing platforms.

FIG. 4 is an example flowchart of processing operations of a method that enables the various features and functionality of the systems as described in detail above. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

Figure 5:
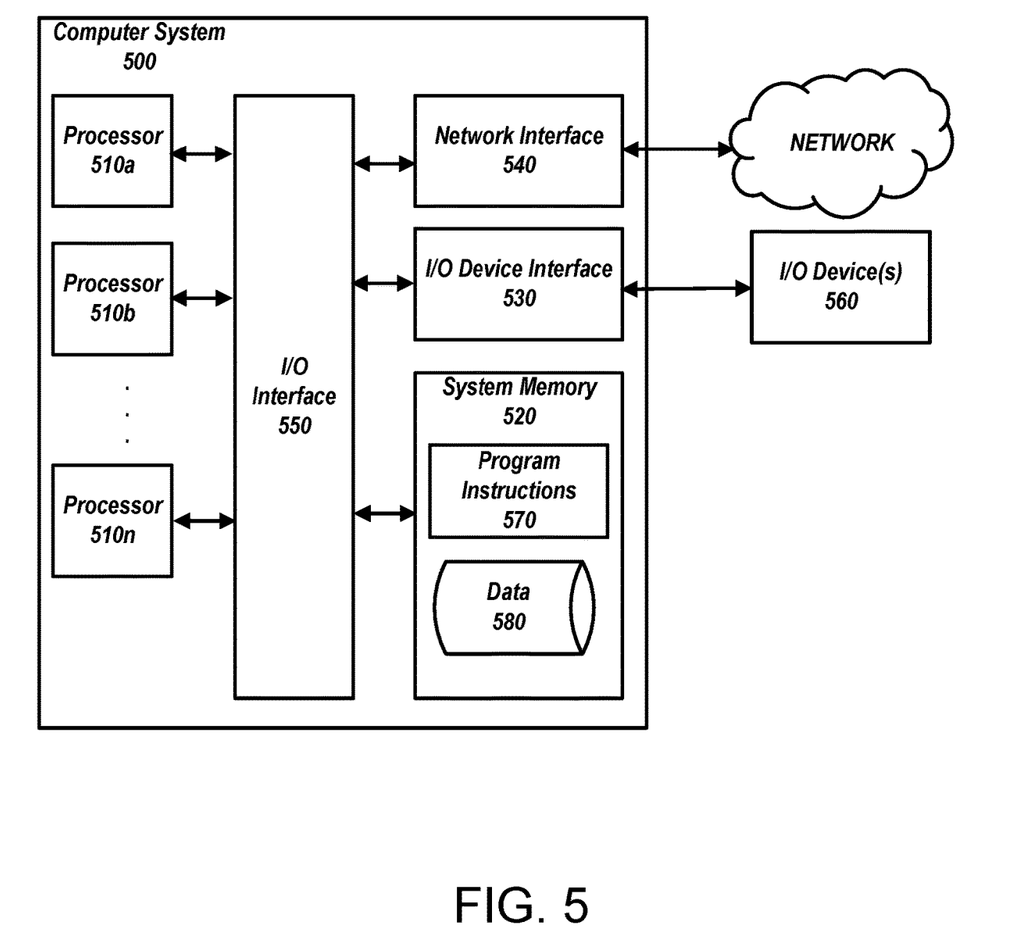
FIG. 5 shows an example computing system that may be used in accordance with some embodiments.

In some embodiments, the method may be implemented in one or more processing devices (e.g., a digital processor, an analog processor, a digital circuit designed to process information, an analog circuit designed to process information, a state machine, or other mechanisms for electronically processing information). The processing devices may include one or more devices executing some or all of the operations of the methods in response to instructions stored electronically on an electronic storage medium. The processing devices may include one or more devices configured through hardware, firmware, or software to be specifically designed for execution of one or more of the operations of the methods. It should be noted that the operations performed by network operation system 102 may be performed using one or more components in system 100 (FIG. 1) or computer system 500 (FIG. 5).

FIG. 4 shows an example flowchart of the actions involved in enabling multiple third-party auxiliary use of a token (e.g., an access token, a single-use access token, a single-use virtual card number, etc.) to facilitate a token-owner-initiated network operation with the third-party entity. For example, process 400 may represent the actions taken by one or more devices shown in FIGS. 1-3 and described above. At 405, network operation system 102 may generate an access token for use by an owner user and a third-party entity. The access token may be designated (e.g., by the network operation system 102) to support a network operation between the token owner user and the auxiliary entity. The token owner user may designate a third-party entity (e.g., as described below at 415) as an auxiliary entity for the token. For example, the token owner may be a user that is shopping via the Internet and the third-party entity may be a merchant or other service provider. The token may be designated for use by the service provider. In one use case, the token may be designated for use by only one merchant, in which case no other merchant or user may be able to use the token. The access token may be configured with a token owner usage count threshold by the token owner. For example, the token may be limited to one use or transaction. The use or transaction may include multiple subparts. For example, the token may be configured to be used to pay a third-party entity (e.g., a merchant) in multiple parts. Each part of the payment may be included as the one use or transaction.

At 410, network operation system 102 may detect an owner-initiated request for use of the access token for a first network operation. The first network operation may be a transaction between the owner user and the third-party entity. For example, the owner-initiated request may indicate that a third-party entity should be granted permission to use the token.

At 415, network operation system 102 may bind the token to the third-party entity. Binding the token with the third-party entity may include configuring the token such that the third-party entity is set as an auxiliary entity of the token. For example, setting the third-party entity as an auxiliary entity of the token may include providing permission to the third-party entity to use the token. Configuring the token such that the third-party entity is set as an auxiliary entity may prevent other third-party entities (e.g., any user other than the owner and the third-party entity to which the token has been bound) from using the token.

Binding the token with the third-party entity may include configuring a resource amount of the first network operation as an auxiliary resource threshold of the access token. The network operation system 102 may set a maximum resource amount that the third-party entity is allowed to use in connection with the token (e.g., an amount of data from a dataset, an amount of network bandwidth in gigabytes, an amount of hours of usage of a cloud service, a monetary amount to be charged to an account, etc.). For example, the third-party entity may be allowed to charge up to a maximum amount on the token for a transaction. The maximum resource amount may be the total amount the third-party entity may charge to the token for a transaction (e.g., including all subparts of the transaction). In one use case, where the token is a virtual card number, if the resource amount configured as an auxiliary resource threshold is $60, and the transaction with the third-party entity includes three payments of $20, then the third-party entity may be allowed to charge the token three times for $20 each time, but may be restricted from charging the token after the total amount charged has reached $60.

At 420, network operation system 102 may receive an entity-initiated request of the third-party entity to use the access token. For example, if the third-party entity is the merchant as described in the example above, the merchant may send a request (e.g., to the network operation system) to use the token. The request may include a resource amount of the token that the third-party entity would like to use.

At 425, network operation system 102 may determine whether the resource amount included in the request would exceed (e.g., cumulatively exceed) the resource amount that was configured as an auxiliary resource threshold of the access token at 415. The network operation system 102 may determine whether the auxiliary-entity-initiated request would cumulatively exceed the auxiliary resource threshold of the access token in view of a granting of one or more other auxiliary-entity-initiated requests of the third-party entity to use the access token. For example, the network operation system 102 may determine the sum total of resources that have been previously requested by the third-party entity for the token. If the sum total of resources that have been previously requested when combined with the resource amount included in the request exceed the auxiliary resource threshold, the network operation system 102 may deny the request.

At 430, the network operation system 102 may grant the request received at 420, for example, in response to determining that the resource amount would not exceed (e.g., cumulatively exceed) the resource threshold (e.g., the auxiliary resource threshold). Granting the request may allow the third-party entity to use the token for the requested amount of resource. For example, by granting the request, the third-party entity may be able to charge the requested amount to the token.

At 435, the network operation system 102 may update one or more parameters of the token to reflect use of the token for the resource amount of the entity-initiated request. The token may include one or more parameters, for example, to indicate a total amount of resources that the token has available, to indicate a resource threshold for a particular third-party entity (e.g., the auxiliary resource threshold described above), or to indicate a running total amount of resource that a third-party entity has used (e.g., a sum of resource amounts of each request that has been granted in connection with the token). For example, the token may include any parameters discussed in connection with FIGS. 1-3 above.

It is contemplated that the actions or descriptions of FIG. 4 may be used with any other embodiment of this disclosure. In addition, the actions and descriptions described in relation to FIG. 4 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-3 or FIG. 5 could be used to perform one or more of the actions in FIG. 4.

FIG. 5 is a diagram that illustrates an exemplary computing system 500 in accordance with embodiments of the present technique. Various portions of systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an I/O device interface 530, and a network interface 540 via an I/O interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a units-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on a remote computer system, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. Non-transitory computer-readable storage media may include non-volatile memory (e.g., flash memory, read-only memory (ROM), programmable read-only memory (PROM), erasable programmable read only memory EPROM, EEPROM memory), volatile memory (e.g., RAM, static random access memory (SRAM), synchronous dynamic RAM (SDRAM)), bulk storage memory (e.g., CD-ROM, DVD-ROM, or hard-drives), or the like. System memory 520 may include a non-transitory computer-readable storage medium that may have program instructions stored thereon that are executable by a computer processor (e.g., one or more of processors 510a-510n) to cause the subject matter and the functional operations described herein. A memory (e.g., system memory 520) may include a single memory device or a plurality of memory devices (e.g., distributed memory devices).

I/O interface 550 may be configured to coordinate I/O traffic between processors 510a-510n, system memory 520, network interface 540, I/O devices 560, or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the peripheral component interconnect (PCI) bus standard or the USB standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a global positioning system (GPS), or the like. Computer system 500 may also be connected to other devices that are not illustrated or may operate as a stand-alone system. In addition, the functionality provided by the illustrated components may, in some embodiments, be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. In some embodiments, some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted; for example, such software or hardware may be intermingled, conjoined, replicated, broken up, distributed (e.g., within a data center or geographically), or otherwise differently organized. The functionality described herein may be provided by one or more processors of one or more computers executing computer code stored on a tangible, non-transitory, machine-readable medium. In some cases, third-party content delivery networks may host some or all of the information conveyed over networks, in which case, to the extent information (e.g., content) is said to be supplied or otherwise provided, the information may be provided by sending instructions to retrieve that information from a content delivery network.

Due to cost constraints, some features disclosed herein may not be presently claimed and may be claimed in later filings, such as continuation applications or by amending the present claims. Similarly, due to space constraints, neither the Abstract nor the Summary section of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the content explicitly indicates otherwise. Thus, for example, reference to "an element" or "the element" includes a combination of two or more elements, notwithstanding use of other terms and phrases for one or more elements, such as "one or more." The term "or" is, unless indicated otherwise, non-exclusive (i.e., encompassing both "and" and "or"). Terms describing conditional relationships, for example, "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents, for example, the antecedent is relevant to the likelihood of the consequent occurring. Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both or all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining," or the like, refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems or methods described above may be applied to, or used in accordance with, other systems or methods.

The present techniques will be better understood with reference to the following enumerated embodiments:

1. A method comprising: receiving a request of the user for a first action of the user with an entity; in connection with granting the request of the user, configuring a token for use by the user and the entity such that (i) the entity is added as an approved entity having permission to use the token to facilitate the first action of the user, and (ii) the token is configured with a resource amount of the first action as a usage threshold of the token for actions of the entity related to the first action; receiving a request of the entity to use the token; determining whether granting the request of the entity would cumulatively exceed the usage threshold of the token, the determining related to the usage threshold being based on multiple requests of the entity to use the token; and based on a determination that granting the request of the third party would not cumulatively exceed the resource usage of the token, granting the request of the entity to use the token.
2. The method of any of the preceding embodiments, further comprising: updating one or more parameters of the token to reflect use of the token for a usage amount indicated by the request of the entity.
3. The method of any of the preceding embodiments, further comprising: receiving a second request to use the token; determining whether granting the second request would exceed the usage threshold of the token; and, denying the second request based on a determination that granting the second request would exceed the usage threshold of the token.
4. The method of any of the preceding embodiments, wherein granting the request of the entity further comprises: determining a total number of third-party requests that have been made to use the token; and granting the request of the entity to use the token based on a determination that the total number of third-party requests does not exceed a threshold number.
5. The method of any of the preceding embodiments, wherein configuring the token for use by the user and the entity comprises: determining the resource amount based on input from the user, wherein the input is associated with the entity.
6. The method of any of the preceding embodiments, further comprising: receiving a second request of the user to use the token; determining whether granting the second request of the user would exceed a maximum usage threshold of the token; and granting the second request based on a determination that granting the second request of the user would not exceed the maximum usage threshold of the token.
7. The method of any of the preceding embodiments, further comprising: receiving, from a second entity, a second request to use the token; denying the second request based on a determination that the token has not been configured with the second entity as the approved entity.
8. The method of any of the preceding embodiments, wherein granting the request of the entity comprises: determining that the request of the entity is received before a threshold date; and granting the request of the entity based on (i) the determination that granting of the third-party request would not exceed the usage threshold of the token, and (ii) a determination that the auxiliary-entity-initiated request is received before the threshold date.
9. The method of any of the preceding embodiments, wherein configuring the token comprises configuring the token as a single-use access token for use by the user as a token owner user and the entity as an auxiliary entity, the single-use access token being designated to support an action of the token owner user with the auxiliary entity, the single-use access token being configured with a token owner usage count threshold of one use by the token owner.
10. The method of claim 9, wherein, in response to detecting an owner-initiated request for use of the single-use access token for the first action of the token owner user with the entity, binding the single-use access token to the entity such that the single-use access token is configured with (i) the entity as the auxiliary entity of the single-use access token, and (ii) the resource amount of the first action as an auxiliary resource threshold of the single-use access token for actions of the auxiliary entity related to the first action.
11. A tangible, non-transitory, machine-readable medium storing instructions that, when executed by a data processing apparatus, cause the data processing apparatus to perform operations comprising those of any of embodiments 1-10.
12. A system comprising: one or more processors; and memory storing instructions that, when executed by the processors, cause the processors to effectuate operations comprising those of any of embodiments 1-10.
13. A system comprising means for performing any of embodiments 1-10.

What is claimed is:
1. A system for enabling multiple third-party auxiliary use of a single-use token to facilitate a token-owner-initiated network operation with a third party, the system comprising:
one or more processors; and
memory storing instructions that, when executed by the one or more processors, cause operations comprising:

in response to detecting a token-owner-initiated request to use a single-use token for a transaction associated with a token owner user with a third-party entity, deactivating use of the single-use token by the token owner user for any other transaction and configuring the single-use token for multiple auxiliary uses by the third-party entity for the transaction such that (i) the third-party entity is added as an auxiliary entity that is approved to use the single-use token to complete the transaction associated with the token owner user, and (ii) the single-use token is configured with a resource amount as a resource amount usage threshold associated with the transaction and with a plural number of uses by the third-party entity as a usage count threshold associated with the transaction, wherein the transaction comprises multiple subparts;

after granting a first third-party request of the third-party entity to use the single-use token for a first subpart of the transaction, receiving a second third-party request of the third-party entity to continue use of the single-use token for a second subpart of the transaction, the first subpart of the transaction corresponding to a first amount of resources, the second subpart corresponding to a second amount of resources;

determining whether a sum comprising the first amount and the second amount would exceed the resource amount usage threshold of the single-use token and whether a cumulative number of third-party requests of the third-party entity for the transaction would exceed the usage count threshold;

granting the second third-party request to use the single-use token based on a determination that the sum would not exceed the single-use token's resource amount usage threshold associated with the transaction and the cumulative number of third-party requests for the transaction would not exceed the single-use token's usage count threshold associated with the transaction;

after granting the first and second third-party requests of the third-party entity, receiving at least one other third-party request of the third-party entity to use the single-use token for at least one other subpart of the transaction;

in response to receiving the at least one other third-party request, processing at least one other resource amount of the at least one other third-party request against the resource amount usage threshold of the single-use token; and in response to the at least one other third-party request cumulatively exceeding the resource amount usage threshold of the single-use token, denying the at least one other third-party request.

2. The system of claim 1, the operations further comprising:

after configuring the single-use token for use by the third-party entity for the transaction associated with the user, receiving at least one additional third-party request of the third-party entity to use the single-use token for at least one other transaction associated with the user, the at least one other transaction being independent of the transaction associated with the user;

determining whether the single-use token has been configured for use with the at least one other transaction associated with the user; and denying the at least one other third-party request based on a determination that the single-use token has not been configured for use with the at least one other transaction.

3. The system of claim 1, the operations further comprising:

receiving at least one third-party request of a second third-party entity to use the single-use token;

in response to receiving the at least one third-party request of the second third-party entity, determining whether the single-use token has been configured with the second third-party entity as the auxiliary entity; and in response to determining that the single-use token has not been configured with the second third-party entity as the auxiliary entity, denying the at least one third-party request of the second third-party entity.

4. The system of claim 1, wherein granting the second third-party request to use the single-use token comprises:

determining whether the second third-party request is received before a threshold date; and granting the second third-party request in response to (i) determining that the resource amount would not cumulatively exceed the resource amount usage threshold of the single-use token, and (ii) determining that the second third-party request is received before the threshold date.

5. A method comprising:

in response to detecting a token-owner-initiated request to use a single-use token for a transaction associated with a token owner user with a third-party entity, deactivating use of the single-use token by the token owner user for any other transaction and configuring the single-use token for multiple auxiliary uses by the third-party entity for the transaction such that (i) the third-party entity is added as an auxiliary entity that is approved to use the single-use token to complete the transaction associated with the token owner user, and (ii) the single-use token is configured with a resource amount as a resource amount usage threshold associated with the transaction and with a plural number of uses by the third-party entity as a usage count threshold associated with the transaction, wherein the transaction comprises multiple subparts;

after granting a first third-party request of the third-party entity to use the single-use token for a first subpart of the transaction, receiving a second third-party request of the third-party entity to continue use of the single-use token for a second subpart of the transaction, the first subpart of the transaction corresponding to a first amount of resources, the second subpart corresponding to a second amount of resources;

determining that a sum comprising the first amount and the second amount would not exceed the resource amount usage threshold of the single-use token and a cumulative number of third-party requests of the third-party entity for the transaction would not exceed the usage count threshold;

granting the second third-party request to use the single-use token based on the determination that the sum would not exceed the single-use token's resource amount usage threshold associated with the transaction and the cumulative number of third-party requests for the transaction would not exceed the single-use token's usage count threshold associated with the transaction;

after granting the first and second third-party requests of the third-party entity, receiving at least one other third-party request of the third-party entity to use the single-use token for at least one other subpart of the transaction;
in response to receiving the at least one other third-party request, processing at least one other resource amount of the at least one other third-party request against the resource amount usage threshold of the single-use token; and
in response to the at least one other third-party request cumulatively exceeding the resource amount usage threshold of the single-use token, denying the at least one other third-party request.

6. The method of claim 5, further comprising:
after configuring the single-use token for use by the third-party entity for the transaction associated with the user, receiving at least one additional third-party request of the third-party entity to use the single-use token for at least one other transaction associated with the user, the at least one other transaction being independent of the transaction associated with the user;
determining that the single-use token has not been configured for use with the at least one other transaction associated with the user; and
denying the at least one other third-party request based on the determination that the single-use token has not been configured for use with the at least one other transaction.

7. The method of claim 5, further comprising:
receiving at least one third-party request of a second third-party entity to use the single-use token;
determining that the single-use token has not been configured with the second third-party entity as the auxiliary entity; and
denying the at least one third-party request of the second third-party entity based on the determination that the single-use token has not been configured with the second third-party entity as the auxiliary entity.

8. The method of claim 5, wherein granting the second third-party request to use the single-use token comprises:
determining that the second third-party request is received before a threshold date related to the transaction; and
granting the second third-party request based on (i) the determination that the resource amount would not cumulatively exceed the resource amount usage threshold of the single-use token, and (ii) the determination the second third-party request is received before the threshold date.

9. The method of claim 5, wherein configuring the single use token for use by the third-party entity comprises:
determining, for the resource amount usage threshold of the single-use token, the resource amount based on input from the user indicating a total amount of resources to be used by the third-party entity for the transaction.

10. The method of claim 5, further comprising:
receiving a second user request of the user to use the single-use token for the transaction; and
granting the second user request of the user to use the single-use token for the transaction.

11. The method of claim 5, wherein the single-use token comprises a virtual card number.

12. The method of claim 5, wherein the single-use token comprises a web token.

13. A non-transitory, computer-readable medium comprising instructions that when executed by one or more processors, causes operations comprising:
in response to detecting a token-owner-initiated request to use a single-use token for a transaction associated with a token owner user with a third-party entity, deactivating use of the single-use token by the token owner user for any other transaction and configuring the single-use token for multiple auxiliary uses by the third-party entity for the transaction such that (i) the third-party entity is added as an auxiliary entity that is approved to use the single-use token to complete the transaction associated with the token owner user, and (ii) the single-use token is configured with a resource amount as a resource amount usage threshold associated with the transaction and with a plural number of uses by the third-party entity as a usage count threshold associated with the transaction, wherein the transaction comprises multiple subparts;
after granting a first third-party request of the third-party entity to use the single-use token for a first subpart of the transaction, receiving a second third-party request of the third-party entity to continue use of the single-use token for a second subpart of the transaction, the first subpart of the transaction corresponding to a first amount of resources, the second subpart corresponding to a second amount of resources;
determining whether a sum comprising the first amount and the second amount would exceed the resource amount usage threshold of the single-use token and whether a cumulative number of third-party requests of the third-party entity for the transaction would exceed the usage count threshold;
granting the second third-party request to use the single-use token based on a determination that the sum would not exceed the single-use token's resource amount usage threshold associated with the transaction and the cumulative number of third-party requests for the transaction would not exceed the single-use token's usage count threshold associated with the transaction;
after granting the first and second third-party requests of the third-party entity, receiving at least one other third-party request of the third-party entity to use the single-use token for at least one other subpart of the transaction;
in response to receiving the at least one other third-party request, processing at least one other resource amount of the at least one other third-party request against the resource amount usage threshold of the single-use token; and
in response to the at least one other third-party request cumulatively exceeding the resource amount usage threshold of the single-use token, denying the at least one other third-party request.

14. The medium of claim 13, the operations further comprising:
after configuring the single-use token for use by the third-party entity for the transaction associated with the user, receiving at least one additional third-party request of the third-party entity to use the single-use token for at least one other transaction associated with the user, the at least one other transaction being independent of the transaction associated with the user; and
denying the at least one other third-party request based on a determination that the single-use token has not been configured for use with the at least one other transaction associated with the user.

15. The medium of claim 13, the operations further comprising:

receiving at least one third-party request of a second third-party entity to use the single-use token; and denying the at least one third-party request of the second third-party entity based on a determination that the single-use token has not been configured with the second third-party entity as the auxiliary entity.

16. The medium of claim 13, wherein granting the second third-party request to use the single-use token comprises:

granting the second third-party request based on (i) the determination that the resource amount would not cumulatively exceed the resource amount usage threshold of the single-use token, and (ii) a determination the second third-party request is received before a threshold date related to the transaction.

17. The medium of claim 13, wherein configuring the single-use token for use by the third-party entity comprises:

determining, for the resource amount usage threshold of the single-use token, the resource amount based on input from the user indicating a total amount of resources to be used by the third-party entity for the transaction.

18. The medium of claim 13, the operations further comprising:

receiving a second user request of the user to use the single-use token for the transaction; and granting the second user request of the user to use the single-use token for the transaction.

19. The medium of claim 13, wherein the single-use token comprises a virtual card number.

20. The medium of claim 13, wherein the single-use token comprises a web token.

* * * * *